US007395874B2

(12) United States Patent
Zeiter

(10) Patent No.: US 7,395,874 B2
(45) Date of Patent: Jul. 8, 2008

(54) SLAVING AND BLOCKING DEVICE

(75) Inventor: Olivier Zeiter, Biberist (CH)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 11/273,424

(22) Filed: Nov. 14, 2005

(65) Prior Publication Data

US 2006/0131043 A1 Jun. 22, 2006

(30) Foreign Application Priority Data

Nov. 16, 2004 (DE) ....................... 10 2004 055 237

(51) Int. Cl.
*B23B 45/02* (2006.01)
*B23B 45/00* (2006.01)

(52) U.S. Cl. ....................... 173/179; 173/176; 173/178; 173/180; 173/181; 192/223.2

(58) Field of Classification Search ......... 173/178–179, 173/176, 180–181, 216–217, 164; 192/223.2, 192/38, 44
See application file for complete search history.

(56) References Cited

U.S. PATENT DOCUMENTS

| | | | | |
|---|---|---|---|---|
| 2,299,739 | A * | 10/1942 | Colson | 192/44 |
| 2,974,553 | A * | 3/1961 | Donowick | 173/178 |
| 3,302,760 | A * | 2/1967 | Taylor | 192/38 |
| 3,752,277 | A * | 8/1973 | Nakai | 192/56.1 |
| 4,711,332 | A * | 12/1987 | Schuster | 192/48.92 |
| 4,947,939 | A * | 8/1990 | Hung | 173/179 |
| 5,147,165 | A * | 9/1992 | Tempest | 409/232 |
| 5,348,126 | A * | 9/1994 | Gao | 192/223.2 |
| 5,586,631 | A * | 12/1996 | Benthin | 192/223.2 |
| 5,947,254 | A * | 9/1999 | Jones | 192/223.2 |
| 5,984,022 | A * | 11/1999 | Harman et al. | 173/176 |
| 6,305,481 | B1 * | 10/2001 | Yamazaki et al. | 173/178 |
| 6,311,787 | B1 * | 11/2001 | Berry et al. | 173/176 |
| 6,508,347 | B1 * | 1/2003 | Hochmuth | 192/44 |
| 6,918,449 | B2 * | 7/2005 | Shinagawa et al. | 173/2 |
| 2001/0017496 | A1 * | 8/2001 | Torii et al. | 310/77 |
| 2002/0130007 | A1 * | 9/2002 | Nakamura et al. | 192/38 |
| 2004/0026099 | A1 * | 2/2004 | Stirm | 173/178 |
| 2004/0040727 | A1 * | 3/2004 | Miller | 173/2 |

FOREIGN PATENT DOCUMENTS

| | | |
|---|---|---|
| DE | 101 48 872 A1 | 4/2003 |
| EP | 0 709 168 | 5/1996 |
| EP | 1 240 983 | 8/2002 |

* cited by examiner

*Primary Examiner*—Rinaldi I. Rada
*Assistant Examiner*—Lindsay Low
(74) *Attorney, Agent, or Firm*—Michael J. Striker

(57) ABSTRACT

A slaving and blocking device for transmitting a torque from a driving part to a driven part and for stopping the driven part at a torque engaging the driven part has a slaving unit fixable on the driving part fixed against relative rotation and having slaving claws that are offset from one another in a circumferential direction, a roller star wheel located in the slaving unit and connectable to the driven part fixed against relative rotation, clamping bodies located in freewheeling fashion between the slaving claws and points of a star of the roller star wheel, a stationary clamping ring located concentrically to the slaving means and the roller star wheel and having an inner annular face forming a counterpart clamping face for the clamping bodies, and radially displaceable centrifugal force elements located in the roller star wheel such that above a predetermined rpm the force elements clamp the roller star wheel firmly to the slaving means.

12 Claims, 2 Drawing Sheets

SLAVING AND BLOCKING DEVICE

BACKGROUND OF THE INVENTION

The invention is based on a slaving and blocking device for transmitting a torque from a driving part to a driven part and for stopping the driven part at a torque engaging the driven part, and in particular on a spindle block for a hand power tool with a rotating tool bit.

A slaving and blocking device of this kind is used as a so-called spindle block or automatic spindle lock in hand power tools, especially power drills or power screwdrivers, so that upon engagement of the tool bit with a workpiece, if there is a simultaneous failure of the energy supply, the hand power tool can be rotated with the tool bit so that the tool bit can be disengaged from its engagement with the workpiece, and also so that a single-sleeve drill chuck can be clamped and released.

A known spindle block (German Patent Disclosure DE 101 48 872 A1) includes a slaving means, connected in a manner fixed against relative rotation to the driving gear wheel for the spindle that carries the tool bit, with three slaving claws, offset from one another by the same circumferential angle; one roller star wheel, connected to the spindle in a manner fixed against relative rotation, with three radially extending points of the star, offset from one another by the same circumferential angle in the circumferential direction; one clamping ring, concentric with the slaving means and the roller star wheel, which is fixed nonrotatably in the housing of the hand power tool; and six clamping rollers. The slaving means receives the roller star wheel in such a way that in the circumferential direction, the slaving claws and the points of the star are located in alternation one behind each other and spaced apart from one another. The six clamping rollers are each placed in the free space, defined on the outside by the inner annular face of the clamping ring, between the slaving claws and the points of the star. If the driving gear wheel is motor-driven, then—regardless of its direction of rotation—three of the six clamping rollers at a time are pressed by the slaving claws against contact faces, extending radially, of the points of the star, and the torque of the driving gear wheel is thus transmitted via the slaving means, the clamping rollers and the rotor star onto the spindle and thus onto the tool bit held in a tool bit receptacle on the spindle. Conversely, if a driving torque is exerted on the spindle by the tool bit, then because of the rotation of the roller star wheel relative to the slaving means, three at a time of the total of six clamping rollers are displaced—again regardless of the direction of rotation—against clamping faces embodied on the points of the star and clamp firmly against the inner annular face, forming a counterpart clamping face, of the clamping ring. The entire torque is output to the clamping ring that is firmly connected to the housing and is not transmitted to the slaving means.

In engineering terms, such a spindle block is the combination of a clutch with rotary play and a controlled free-wheel. Because of the rotary play in the clutch, a clicking noise occurs when the hand power tool is braked, since the roller star wheel constantly swings back and forth between clutch engagement and free-wheeling, and thus the rollers are constantly lifting from the slaving faces on the slaving claws and the contact faces on the roller star wheel and striking slaving faces and contact faces again. This clicking noise is mistakenly thought by many users to be a defect of the hand power tool.

SUMMARY OF THE INVENTION

It is therefore an object of the present invention to provide a slaving and blocking device, which eliminates the disadvantages of the prior art.

In keeping with these objects and with others which will become apparent hereinafter, one feature of the present invention resides, briefly stated, in a  claim 1**

The slaving and blocking device of the invention, in particular a spindle block, has the advantage that by means of the firm clamping, as a function of centrifugal force, of the roller star wheel on the slaving means above a predetermined rpm, the roller star wheel can no longer swing back and forth upon braking of the hand power tool, and thus no clicking or clacking noise occurs. By suitable dimensioning of the centrifugal force elements, the rpm threshold for firmly clamping the roller star wheel on the slaving means, and for releasing it again, can be selected such that upon braking of the hand power tool below the rpm threshold, the clicking is so soft that it is no longer perceived by the user.

In an advantageous embodiment of the invention, the centrifugal force elements are inserted axially displaceably into radial conduits, and the radial conduits come to an end in the open at the inner boundary face of the slaving claws. The centrifugal force elements are preferably embodied as displacement wedges, with a point of the wedge pointing toward the slaving claws, and the wedge angle is 90° or less, for instance being 60° or 50°. Alternatively, the centrifugal force elements may be embodied as needle rollers or balls, which has the advantage that readily commercially available needle rollers or balls of needle or ball bearings can be used.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
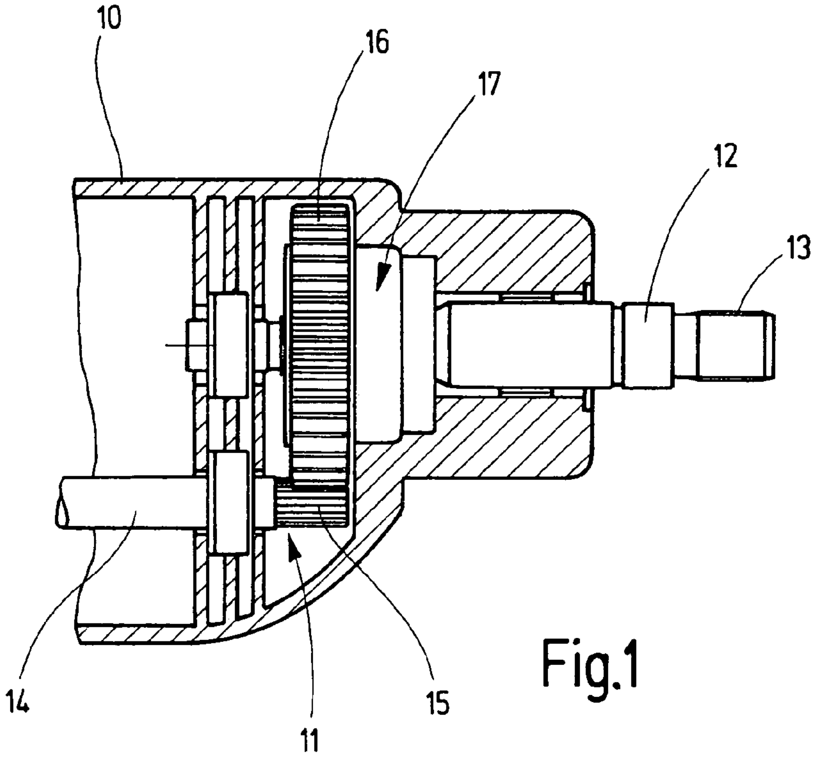
FIG. 1 is a fragmentary longitudinal section of a hand power tool with a spindle, spindle block, and motor rotary drive for the spindle block and the spindle.

The hand power tool schematically shown in FIG. 1 in fragmentary longitudinal section is embodied as a power drill or power screwdriver. It has a housing 10, a motor rotary drive 11 received in the housing 10, and a spindle 12, which is rotatably supported in the housing 10 and protrudes axially out of the housing 10 and on its end has a male thread 13 for screwing on a clamping chuck for a drill or screwdriver. Of the motor rotary drive 11, the driven shaft 14 of an electric motor is shown schematically, which on its end has a drive pinion 15 that meshes with a driving gear wheel 16, rotatably supported in the housing 10, for the spindle 12. The driving gear wheel 16 located coaxially with the spindle 12 is connected to the spindle 12 via a spindle block 17.

Figure 2:
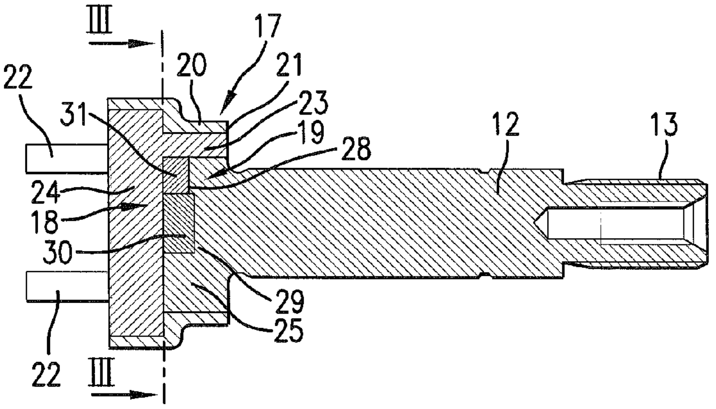
FIG. 2 is a longitudinal section through the spindle and spindle block, shown enlarged.
Figure 3:
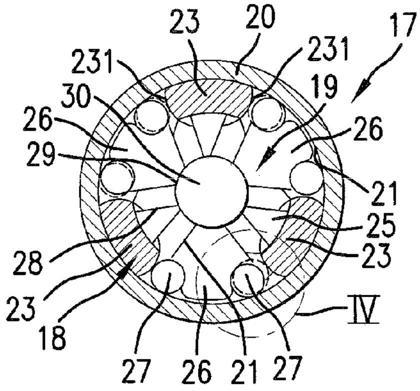
FIG. 3 is a section taken along the line III-III in FIG. 2.

The spindle block 17 shown in FIGS. 2 and 3 in various sections is a slaving and blocking device, which on the one hand transmits a torque from a driving part, which in this exemplary embodiment is formed by the driving gear wheel 16, to a driven part, which in this exemplary embodiment is formed by the spindle 12, and on the other, at a torque that engages the driven part, in this exemplary embodiment the spindle 12, stops the driven part, in this example the spindle 12, on the housing 10 by clamping. To that end, the spindle block 17 has a slaving means 18, a roller star wheel 19 which is placed in the slaving means 18, and a clamping ring 20, concentrically surrounding the slaving means 18 and roller star wheel 19, the inner annular face of the clamping ring forming a counterpart clamping face 21 for clamping bodies 27, located between the slaving means 18 and the roller star wheel 19, to be described in further detail below.

The slaving means 18 is connected to the driving gear wheel 16 in a manner fixed against relative rotation, and for that purpose, on its end face facing away from the spindle 12 it has a plurality of axially protruding pegs 22, which in form-locking fashion engage corresponding axial bores in the driving gear wheel 16. The slaving means 18 has a disklike slaving body 24, on which, on its face end toward the spindle 12, three slaving claws 23, embodied in one piece with the slaving body 24, protrude axially. The slaving claws 23 are offset from one another by equal circumferential angles.

The roller star wheel 19 has a central star body 25, on which three radially protruding points 26 of the star are shaped in one piece. The total of three points 26 of the star in this exemplary embodiment are offset from one another by equal circumferential angles. The circumferential angle of the points 26 of the star is equivalent to the circumferential angle of the slaving claws 23 at the slaving means 18. In the exemplary embodiment, the roller star wheel 19 is embodied in one piece with the spindle 12 and is embodied on the end of the spindle facing toward the slaving means 18. The roller star wheel 19 is inserted into the slaving means 18 such that in alternation, again and again, one after the other in the circumferential direction there are a slaving claw 23 and a point 26 of the star, which are spaced apart from one another in the circumferential direction. The points 26 of the star are embodied such that in the radial direction they end with gap spacing in front of the counterpart clamping face 21 of the clamping ring 20. In each free space formed between one slaving claw 23 and one point 26 of the star, which space is defined on the outside by the counterpart clamping face 21 of the clamping ring 20, one of the total of six clamping rollers 27 is placed.

Figure 4:
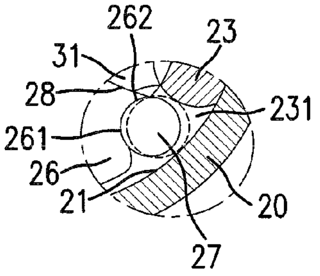
FIG. 4 is an enlarged view of the detail marked IV in FIG. 3.

The clamping rollers 27 cooperate with slaving faces 231, which are embodied on sides facing away from each other of the slaving claws, and also with contact face 261 and clamping faces 262, which are embodied on sides facing away from each other of the points 26 of the star (FIG. 4), specifically in such a way that when the slaving means 18 is driven, three slaving faces 231 of the slaving claws 23, which slaving faces point in the direction of rotation of the slaving means 18, press three clamping rollers 27 against the contact faces 261 of the points 26 of the star, and the other three clamping rollers 27 rest on the remaining three contact faces 261 of the points 26 of the star. Regardless of the direction of rotation of the slaving means 18, the torque is transmitted, via the slaving claws 23, the clamping rollers 27, and the points 26 of the star, to the roller star wheel 19 and thus to the spindle 12 that is firmly connected to the roller star wheel 19. The tool bit fastened in the tool bit receptacle of the spindle 12 rotates.

Conversely, if a driving torque is exerted on the spindle block 17 by the tool bit via the spindle 12, or in other words the roller star wheel 19 is driven, then three clamping rollers 27 of the total of six clamping rollers 27 press against the counterpart clamping face 21 of the clamping ring 20, so that the roller star wheel 19 is firmly clamped on the clamping ring 20. The entire torque is thus braked at the clamping ring 20 connected to the housing 10 and is not transmitted to the slaving means 18.

As can be seen particularly from FIG. 3, radial conduits 28 in the form of radial grooves are made in the face end, toward the slaving means 18, of the roller star wheel 19 and come to an end in the open at the outer circumference of the star body 25 between the points 26 of the star, and thus in the region of the slaving claws. In the interior, the radial conduits 28 discharge into a central recess 29, made in the face end, into which a closure body 30 in the form of a disk is inserted and rests flush with the face end of the star body 25. One centrifugal force element 31 is placed with play in each radial conduit 28, so that it can slide in the radial conduit 28.

The centrifugal force elements 31 are dimensioned such that when a predetermined rpm of the spindle block 17 is reached, they press against the slaving claws 23, and lock the roller star wheel 19 and the slaving means 18 to one another in force-locking fashion. As a result, upon braking of the hand power tool above this rpm, the slaving means 18 cannot shift from one end stop of its slaving claws to the other, and thus a clicking noise in braking the hand power tool is avoided. By suitable dimensioning of the centrifugal force elements 31, the rpm threshold at which the centrifugal force elements 31 become operative or become inactive again is designed such that the user when braking the hand power tool below the rpm threshold no longer notices the clicking noise.

Figure 5A:
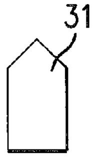
FIG. 5 shows various embodiments of centrifugal force elements in the spindle block of FIGS. 2 and 3.
Figure 5B:
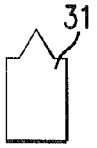
Figure 5C:
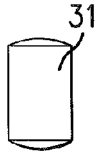
Figure 5D:

In the exemplary embodiment of FIGS. 2 and 3, the centrifugal force elements 31 are embodied as wedges. The wedges may have different wedge angles, as shown in FIG. 5*a* and FIG. 5*b*. In the exemplary embodiment of FIG. 5*a*, the wedge angle is 90°, and in the exemplary embodiment of FIG. 5*b* it is 50°. Alternatively, needle rollers (FIG. 5*c*) or balls (FIG. 5*d*) may be inserted as centrifugal force elements 31 into the radial conduits 28.

It will be understood that each of the elements described above, or two or more together, may also find a useful application in other types of constructions differing from the types described above.

While the invention has been illustrated and described as embodied in a slaving and blocking device, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

The invention claimed is:

1. A slaving and blocking device for transmitting a torque from a driving slaving part to a driven part and for stopping the driven part at a torque engaging the driven part, comprising means for slaving fixable on the driving part in a manner fixed against relative rotation and having slaving claws that are offset from one another in a circumferential direction; a roller star wheel which is located in said means for slaving and is connectable to the driven part in a manner fixed against relative rotation; clamping bodies located in freewheeling fashion in the circumferential direction between said slaving claws and points of a star of said roller star wheel; a stationary clamping ring located concentrically to said means for slaving and said roller star wheel and having an inner annular face forming a counterpart clamping face for said clamping bodies; and radially displaceable centrifugal force elements located in said roller star wheel such that above a predetermined rpm said force elements clamp said roller star wheel firmly to said means for slaving, wherein the slaving and blocking device is a spindle block which transmits torque from a rotary drive to a driven spindle and stops the driven spindle at a torque that engages the driven spindle.

2. A slaving and blocking device as defined in claim 1, wherein said clamping bodies are configured as clamping rollers.

3. A slaving and blocking device as defined in claim 1, wherein said points of said star protrude in one piece radially from a star body of said roller star wheel; and further comprising radial conduits embodied in said star body and coming to an end in a region of inner boundary faces of said clamping claws of said means for slaving, said centrifugal force elements being located displaceably in said radial conduits.

4. A slaving and blocking device as defined in claim 3, wherein said star body has an inner central recess, said radial conduits discharge into said inner central recess; and further comprising a closure body which is inserted into said inner central recess in form-locking fashion.

5. A slaving and blocking device as defined in claim 1, wherein said means for slaving has a disk-shaped slaving body, on which said slaving claws are located, axially protruding, in one piece; and further comprising radial conduits formed by grooves provided in a face end facing toward said means for slaving.

6. A slaving and blocking device as defined in claim 1, wherein said centrifugal force elements are configured as displacement wedges which have a point of a wedge pointing to said slaving claws.

7. A slaving and blocking device as defined in claim 1, wherein said centrifugal force elements are configured as needle rollers.

8. A slaving and blocking device as defined in claim 1, wherein said centrifugal force elements are configured as balls.

9. A slaving and blocking device as defined in claim 1, wherein said roller star wheel is configured on and in one piece with a driven part.

10. A slaving and blocking device as defined in claim 1, wherein the slaving and blocking device for transmitting a torque from a driving part to a driven part and for stopping the driven part at a torque engaging the driven part is configured as a spindle block for hand power tools with a rotating tool bit.

11. A hand power tool, having an electric motor rotary drive for rotationally driving a spindle that carries a tool bit; and a slaving and blocking device for transmitting a torque from a driving part to a driven part and stopping the driven part at a torque engaging the driven part, said slaving and blocking device being located between said rotary driven and said spindle and comprising means for slaving fixable on the driving part in a manner fixed against relative rotation and having slaving claws that are offset from one another in a circumferential direction; a roller star wheel which is located in said means for slaving and is connectable to the driven part in a manner fixed against relative rotation; clamping bodies located in freewheeling fashion in the circumferential direction between said slaving claws and points of a star of said roller star wheel; a stationary clamping ring located concentrically to said means for slaving and said roller star wheel and having an inner annular face forming a counterpart clamping face for said clamping bodies; and radially displaceable centrifugal force elements located in said roller star wheel such that above a predetermined rpm said force elements clamp said roller star wheel firmly to said means for slaving, wherein the slaving and blocking device is a spindle block which transmits torque from a rotary drive to a driven spindle and stops the driven spindle at a torque that engages the driven spindle.

12. A hand power tool as defined in claim 11, wherein the hand power tool is a hand power tool selected from the group consisting of a power drill and a power screwdriver.

* * * * *